United States Patent [19]

Hirasawa et al.

[11] Patent Number: 5,379,429
[45] Date of Patent: Jan. 3, 1995

[54] METHOD OF RESOURCE MANAGEMENT FOR VERSION-UP IN A COMPUTER SYSTEM AND SYSTEMS THEREFOR

[75] Inventors: Shigeki Hirasawa, Sagamihara; Kinji Mori, Machida; Masayuki Orimo, Kawasaki; Masuyuki Takeuchi, Fujisawa; Hiroshi Fujise, Yokohama; Hitoshi Suzuki, Owariasahi; Ichitaro Koai, Chigasaki, all of Japan

[73] Assignee: Hitachi, Ltd., Tokyo, Japan

[21] Appl. No.: 944,848

[22] Filed: Sep. 14, 1992

[30] Foreign Application Priority Data

Sep. 20, 1991 [JP] Japan ................................. 3-241100

[51] Int. Cl.6 ............................................. G06F 15/00
[52] U.S. Cl. ..................... 395/700; 364/DIG. 1; 364/269.2; 364/284.4; 364/285.4; 364/286; 371/11.1
[58] Field of Search ............................................. 395/650

[56] References Cited

U.S. PATENT DOCUMENTS 5,008,814  4/1991  Mathur ................................. 364/200
5,055,999 10/1991  Frank et al. ........................... 364/200
5,232,670  8/1993  Wakerly ................................ 395/425

OTHER PUBLICATIONS

Segal et al.; "Dynamic Program Updating in a Distributed Computer System"; IEEE; 1988.

*Primary Examiner*—Kevin A. Kriess
*Assistant Examiner*—J. Xaysama Backenstose
*Attorney, Agent, or Firm*—Fay, Sharpe, Beall, Fagan, Minnich & McKee

[57] ABSTRACT

A resource management method and system for version-up in a multiprocessor system having functions that a processor to be made version-up investigates resources under control by the own processor itself before deciding if any of the resources are to be moved and/or duplicated, that the processor can decide the processors to which the movement and/or duplication of any of the resources is destined, that the resource is moved or duplicated to the destined processor. After that, version-up of the processor to be made version up is executed, thereby effectively using the resources and making version-up while the multiprocessor system is under operation.

14 Claims, 6 Drawing Sheets

METHOD OF RESOURCE MANAGEMENT FOR VERSION-UP IN A COMPUTER SYSTEM AND SYSTEMS THEREFOR

BACKGROUND OF THE INVENTION

1. Field of the Invention

The present invention relates to a "version-up" method and system for a multiprocessor system, or the like, having a plurality of processors connected thereto, to form a network.

2. Description of the Prior Art

Conventionally, such a version-up of software and hardware has often been made in a computer system having a multiprocessor configuration of a plurality of processors connected to a network system. The conventional version-up techniques have usually had to stop the entire system even if it is only made for a part of a processor of the system. A computer system of a single processor configuration cannot have the version-up unless the entire system is stopped.

Even if the computer system of a multiprocessor configuration is not entirely stopped, parts of the features of processors have been requested to stop if being only somewhat related to the processor that is to be made version-up. If the version-us was to be made for a processor related to processes, such as an inter-process communication and file access, for example, we also have had to request processors other than the one to be made the version-up to stop part of their functions.

For the version-up of hardware and an operating system, we have had to stop processes running in processors to be made the version-up, and the files therefor could not be used.

In any case, the version-up has been conventionally made by stopping all or part of the resources in the system.

With the prior art systems, a user of the computer system has had his or her work interrupted, and once interrupted for a long period of time since version-up has been made by stopping all or part of the resources. In other words, the prior art systems did not take into account that the resources in the system should be effectively used during the version-up. They also did not take into consideration that the user should continue the computer work during the version-up. This limited or inhibited the user's work during the version-up.

Thus, the version-up was accomplished by limiting or stopping the user's work or during the time while the user was not running the system, for example, during night or holiday. This was inconvenient for a superuser who is allowed to make the version-ups, such as a system manager, and for the user who wished to do the work. It was very inadequate for efficient use of the resources of the system.

Further, it is also undesirable to use the prior art version-up method as it would cause a system-down in a system that is required to run all day long without stopping.

SUMMARY OF THE INVENTION

In view of the foregoing, it is an object of the present invention to provide a version-up method and system for making version-up system functions of software and hardware of a computer system having a plurality of processors connected thereto to form a network or a computer system of single processor configuration in an efficient way so that the resources in the system can be used while a user continues a computer work.

Briefly, the foregoing object is accomplished in accordance with aspects of the present invention by the version-up method and system of functions in a multiprocessor system having a plurality of processsors connected thereto to form a network in the way that any of the processors to be made version-up will investigate the resources under its control before deciding if any of the resources are to be moved and/or duplicated, that the processor to be made version-up decides the processors to which the movement and/or the duplication of any of the resources is destined, that the processor to be made version-up interchanges information about any of the resources with the destination processor of the movement and/or duplication before moving and/or duplicating the resource, and that if then version-up of the processor to be made version-up is executed.

Also, the foregoing object is accomplished by the version-up method and system functions in a computer system having a single processor and including a transmission line in the way that a new processor is connected thereto for movement or duplication.

In the above-mentioned computer system having the plurality of processors connected thereto, the software or hardware can be made version-up in the way that resources concerned with the processor to be made version-up are moved to or duplicated in another processor in the system. In the system of a single processor, also, the resources are moved to or duplicated in the newly connected processor. This assures that the resources in the system can be effectively used. In other words, a user can continue his or her computer work while using the resources that have been moved to or duplicated in the other processor. The system can be made version-up in parallel with that.

The foregoing and other objects, advantages, manner of operation and novel features of the present invention will be understood from the following detailed description when read in connection with the accompanying drawings.

BRIEF DESCRIPTION OF THE DRAWINGS

The present invention may be more fully described by reference to the accompanying drawings in which.

DETAILED DESCRIPTION OF THE PREFERRED EMBODIMENT

The following describes in detail a first embodiment according to the present invention by reference to the accompanying drawings.

Figure 1:
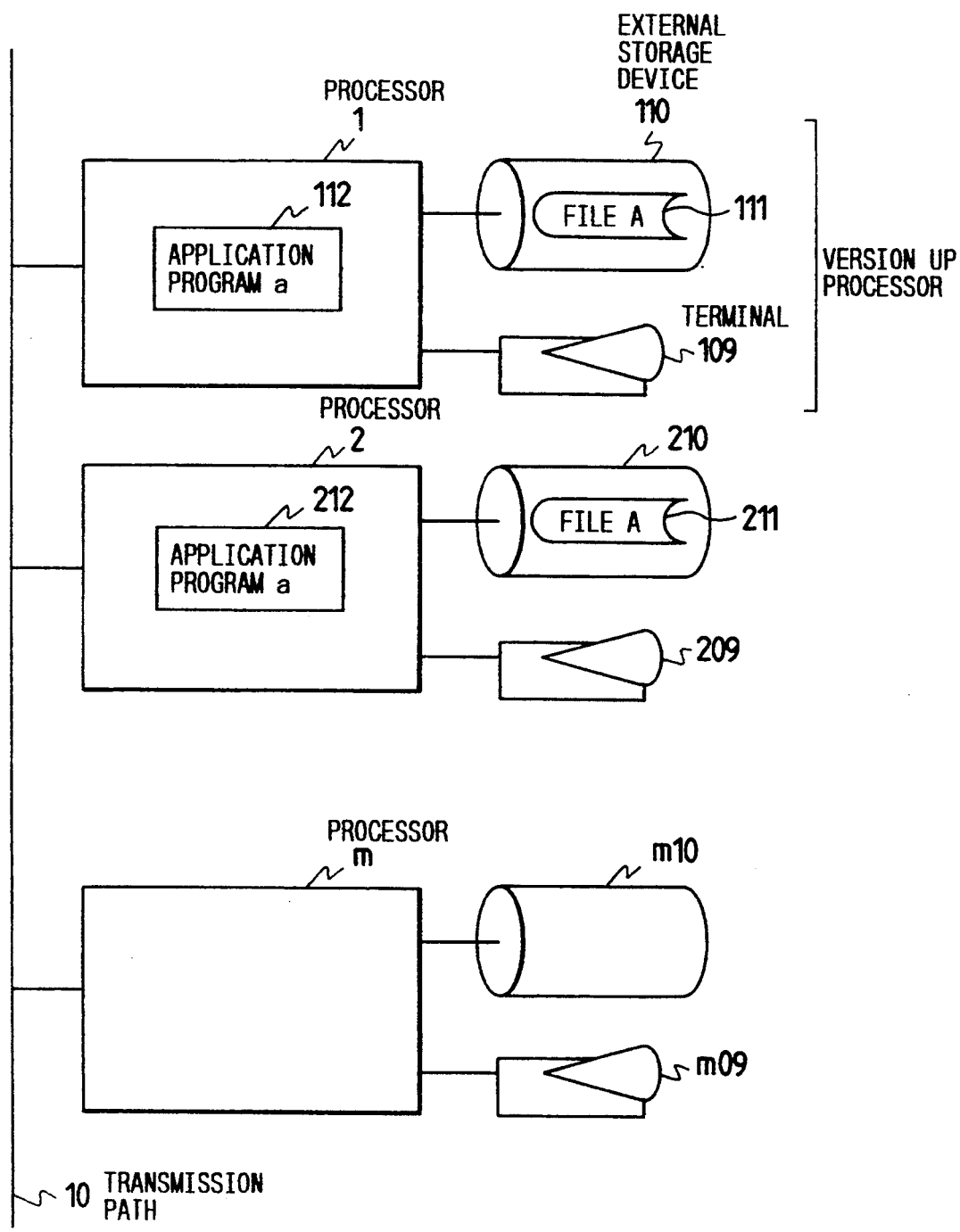
FIG. 1 is an example of a multiprocessor system to which a version-up method in a first embodiment of the present invention is applied.

FIG. 1 is an example of a multiprocessor system to which a version-up method of the present invention is applied. In the figure, processors 1, 2, and so on are interconnected through a transmission line 10 to send or receive data among themselves. Each of the processors have the respective external storages 110, 210, and so on and the respective terminals 109, 209, and so on.

Figure 2:
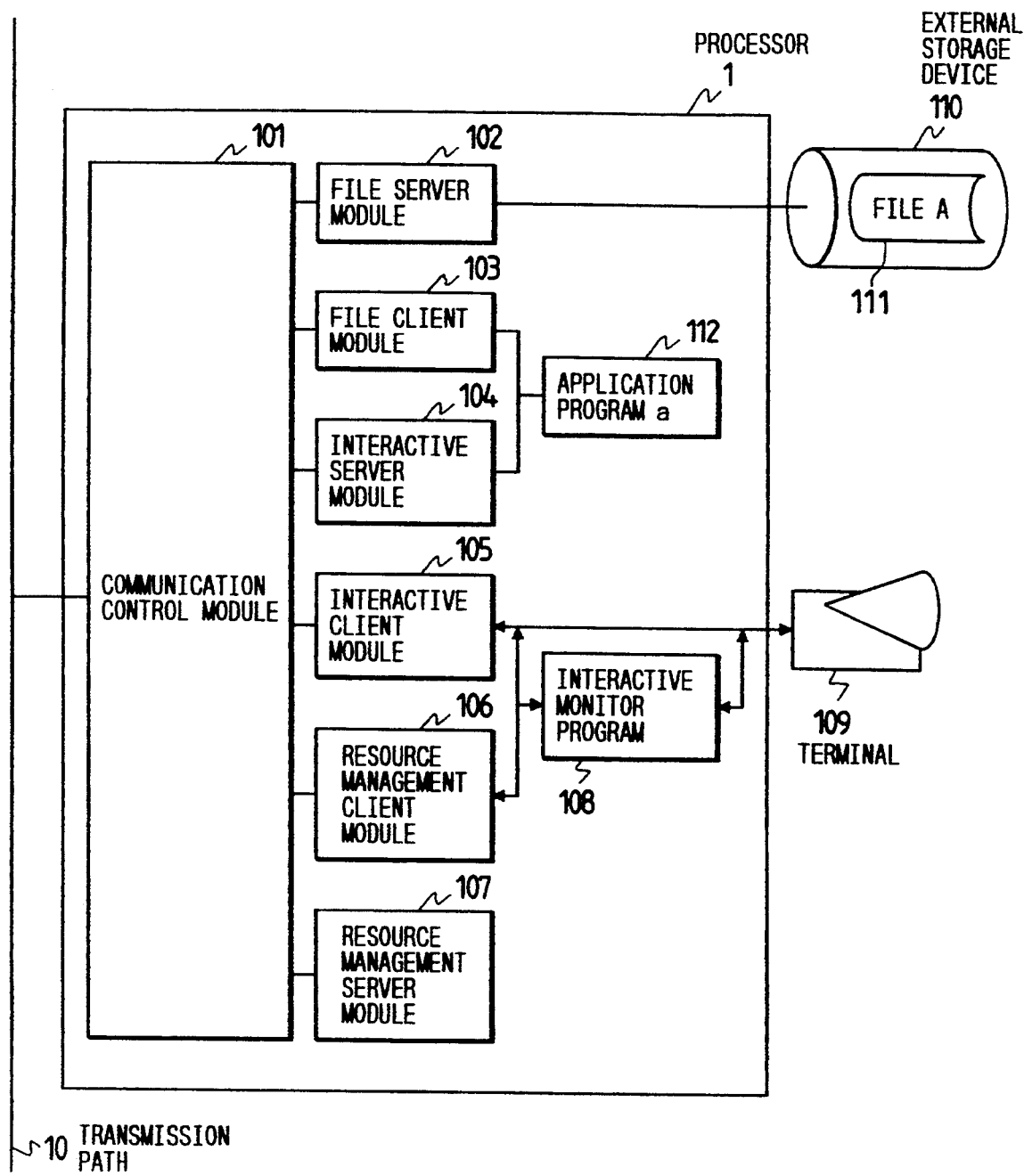
FIG. 2 is a module configuration in a processor in the multiprocessor system shown in FIG. 1.

FIG. 2 is a module configuration of the processor 1 in the multiprocessor system shown in FIG. 1. The processor 1 is described below by reference to FIG. 2 and any of the other processors 2, 3, and so on have a similar module configuration.

In FIG. 2, a communication control module 101 is a module to process sending and receiving on the transmission line 10. The communication control module 101 serves for interface between the transmission line 10 and any of a file server module 102, a file client module 103, an interactive server module 104, an interactive client module 105, a resource management client module 106, and a resource management server module 107. That is, these modules 102 to 107 accomplish send and receive with the transmission line 10 through the communication control module 101.

The file client module 103 is a module to interface with an application program a 112. In other words, the file client module 103 accepts a file access request from the application program a 112 and sends the file access request data to the transmission line 10 through the communication control module 101. It also transfers to the application program a 112 file access results data received by the communication control module 101 through the transmission line 10.

The file server module 102 receives the file access request data from the transmission line 10 through the communication control module 101. It then executes the file access process for the external storage device 110 connected on the basis of the file access request data. It also sends the file access results data to the transmission line 10 through the communication control module 101.

The interactive client module 105 is a module to interface with the terminal 109. That is, the interactive client module 105 sends data input from the terminal 109 to the transmission line 10 through the communication control module 101 as terminal input data. It also sends to the terminal 109 terminal output-data the communication control module 101 received from the transmission line 10. It further sends to the transmission line 10 through the communication control module 101 an application program start request from an interactive monitor program as start request data.

The interactive server module 104 is a module to interface with the application program a 112. That is, it sends to the transmission line 10 through the communication control module 101 output data to a terminal as the terminal output data. It also transfers to the application program a 112 terminal input data the communication control module 101 received from the transmission line 10. It further starts the application program a 112 as it receives the start request data input through the communication control module 101.

The resource management client module 106 and the resource management server module 107 duplicate or move a process, a file, an interaction right on the basis of a resource duplication or movement request from the interactive monitor program. The interactive monitor program is started by an operating system of a user processor when a user starts a session before analyzing a user key-in command for process.

In FIG. 1, a user multiplexes two identical application programs a 112 and 212 in the respective processors 1 and 2 for his or her work. Also, the external storage devices 110 and 210 have identical contents of files A 111 and 211 multiplexed therein. Such a multiplex technique was disclosed, for example, in detail in the Japanese Patent Application Laid-Open Hei 2-193249 and 3-92942.

In turn, the following describes how to start the application program and make a version-up of the processors in the example of a system where the application program and the file are duplexed as in FIG. 1. Starting and version-up are not limited to the duplexed system, but similarly can be made in more multiplexed ones.

Assume that a user directs the application program a to start from the terminal 109 in the system shown in FIGS. 1 and 2. The interactive monitor program analyzes the direction given by the terminal 109 before requesting the interactive client module 105 to start the application program a. The interactive monitor program also transfers an I/O right with the terminal 109 to the interactive client module 105. Accepting it, the interactive client module 105 transfers the request to the communication control module 101 as the start request data. The communication control module 101 sends the start request data to transmission line 10.

The start request data is first transferred through the communication control module 101 to the interactive server module 104 in the processor 1. It also is transferred through the transmission line 10 to the interactive server module in the processor 2. Assume that the application program is to be started only by the processor 1 and processor 2. Starting the application program a may be designated when the user enters a start command as stated above; alternatively, it may be determined in advance. The interactive server modules in the processors 1 and 2 starts the respective application programs a 112 and 121 asynchronously. Note that the application program a 112 indicates the application program a started by the processor 1, and the application program a 212 is the application program a started by the processor 2.

To feed data from the application program a 112 to a terminal, first the application program a 112 feeds the output data to the interactive server module 104. The interactive server module 104 transfers the output data through the communication control module 101 to the interactive client module 105. At the same time, the communication control module 101 sends the output data to the transmission line 10. Similarly, the output data fed from the application program a 212 to the terminal are sent through the interactive server module and the communication control module in the processor 2 to the transmission line 10. The output data from the processor 2 are input through the communication control module 101 of the processor 1 to the interactive client module 105. The interactive client module 105 makes a matching of the two sets of output data before sending them out to the terminal 109. The matching is to select a single datum from among a plurality of data. The data input from the terminal 109 are transferred through the interactive client module 105 to the application programs a 112 and 212.

Access request of the application program a 112 to the file A is first accepted by the file client module 103. Receiving it, the file client module 103 transfers the request to the communication control module 101 as file access request data. The communication control module 101 sends the file access request data to the transmission line 10.

The file access request data is transferred through the communication control module 101 to the interactive server module 104 in the processor 1 first. It also is transferred through the transmission line 10 to the file server module in the processor 2. Similarly, the file access request of the multiplexed application program a 212 to the file A also is transferred to the file server modules in the processors 1 and 2 as file access request data. The two file server modules in the processors 1 and 2 makes a matching of the respective two sets of request data before accessing the respective files A 111 and 211 asynchronously on the basis of the request data. Note that the file A 111 indicates the file A in the external storage device 110 for the processor 1, and the file A 211 is the file A in the external storage device 210 of the processor 2.

The file server modules of the processors 1 and 2 send access results to the respective communication control modules as file access results data. Each of the communication control modules, for example, the communication control module 101 in the processor 1, transfers the file access results data to the file client module 103. It also transfers the data to the file client module in the processor 2 through the transmission line 10 and the communication control module in the processor 2. Similarly, the file access results data sent out of the file server module of the processor 2 are transferred to the file client modules of the processors 1 and 2. The file client modules of the processors 1 and 2 makes a matching of the respective two sets of file access results data before transferring the results to application program a.

Now, we are to replace (version-up), for example, the software or hardware of the processor 1, while the user is working with the terminal 109 in a process and file multiplexed modes of operation, wherein the process includes a program counter, a register, and a program containing current values of variables in execution.

Figure 3:
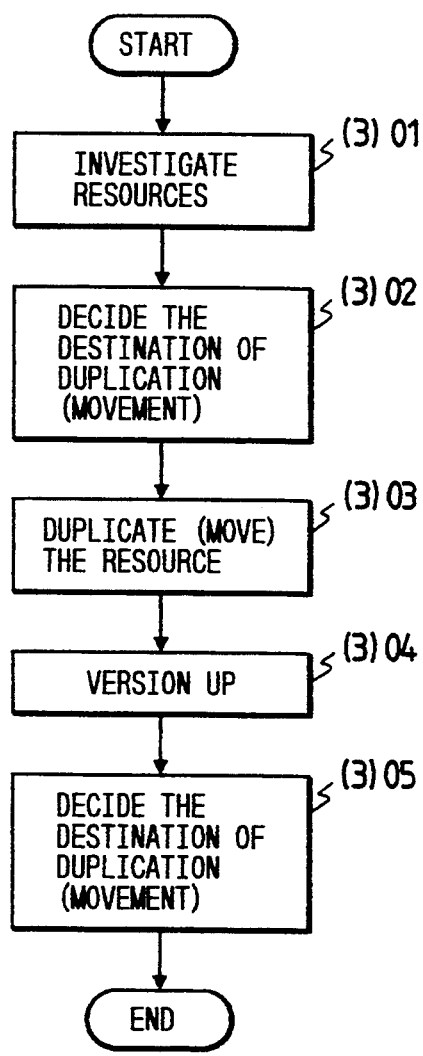
FIG. 3 is a flow chart illustrating how to make the version-up in the first embodiment.

The following describes how to make version-up by reference to a flow chart in FIG. 3. First, resources controlled by the processor 1 are investigated in a way described below before the version-up (step 301). A version-up command for the processor 1 is input from a terminal of a processor. Note that the command can be executed from any of the processors in the system. Also, note that the command can be used only by a superuser. Assume that the terminal of the processor 1 enters the version-up command for the processor 1. The interactive monitor program analyzes it before requesting the resource management client module 106 to investigate the controlled resources. Accepting it, the resource management client module 106 transfers the request through the communication control module 101 to the resource management client module 106 of the processor 1 that is a processor for which version-up was requested. The transfer is not needed actually as the transferring and transferred modules are the same resource management client module 106. If a terminal of another processor enters the version-up command for the processor 1, the controlled resources investigation request is transferred to the resource management client module 106 of the processor 1 through the communication control module of the processor and the transmission line 10.

The resource management client module 106 having the controlled resources investigation request transferred thereto investigates the resources under its control as to whether they are alone in the system. That is, it investigates as to the following five conditions about the resources of the processor 1 itself.

(1) Is there any program that can be started by another processor in the system, provided that the program is not multiplexstarted, that is, a plurality of the same programs exist in a plurality of the respective processors and cannot be started at the same time?

(2) Does the program mentioned above exist as the process running currently?

(3) Is there any file that can be used by another processor in the system, provided that the file is not multiplexed, that is, a plurality of the same files are connected with a plurality of other different processors?

(4) Is there any user having an interaction right at the time?

(5) In addition to the conditions (1) to (3) specified above, is there any of the application programs, their processes, and files that have been designated to move in advance at the time of version-up?

As to the resources mentioned in conditions (1) and (2), the user should designate them in the system in advance so that another processor can use them. They have to be duplicated or moved as designated in advance according to condition (5), although the user's personal files are unique, or individual, in the system. All the user's personal files, of course, may be designated. Thus, the system can easily determine the resources in conditions (1), (3), and (5), as these are designated in advance. It also can easily determine as to conditions (2) and (4) as it executes process control and terminal control.

In the example given in FIGS. 1 and 2 are provided the application program a as the process and the file A as the file which is being accessed. They both are multiplexed. These, therefore, are determined that they may not be duplicated or moved. As the user is interacting from the terminal 109 with the application program a, however, the system determines that the interaction right must be moved (step 301).

Figure 4:
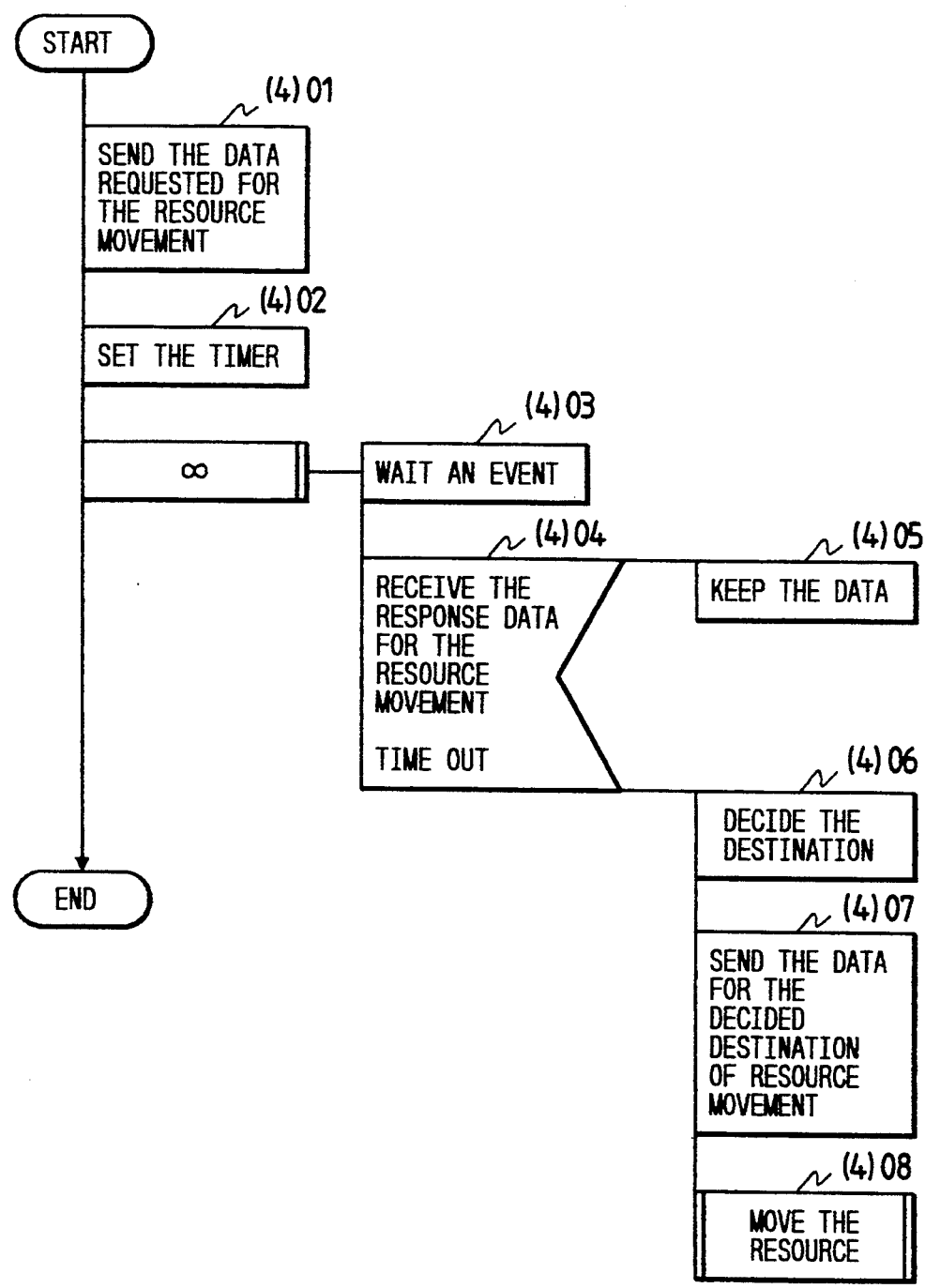
FIG. 4 is a flow chart illustrating a decision process of destination of movement for a resource management client module.
Figure 5:
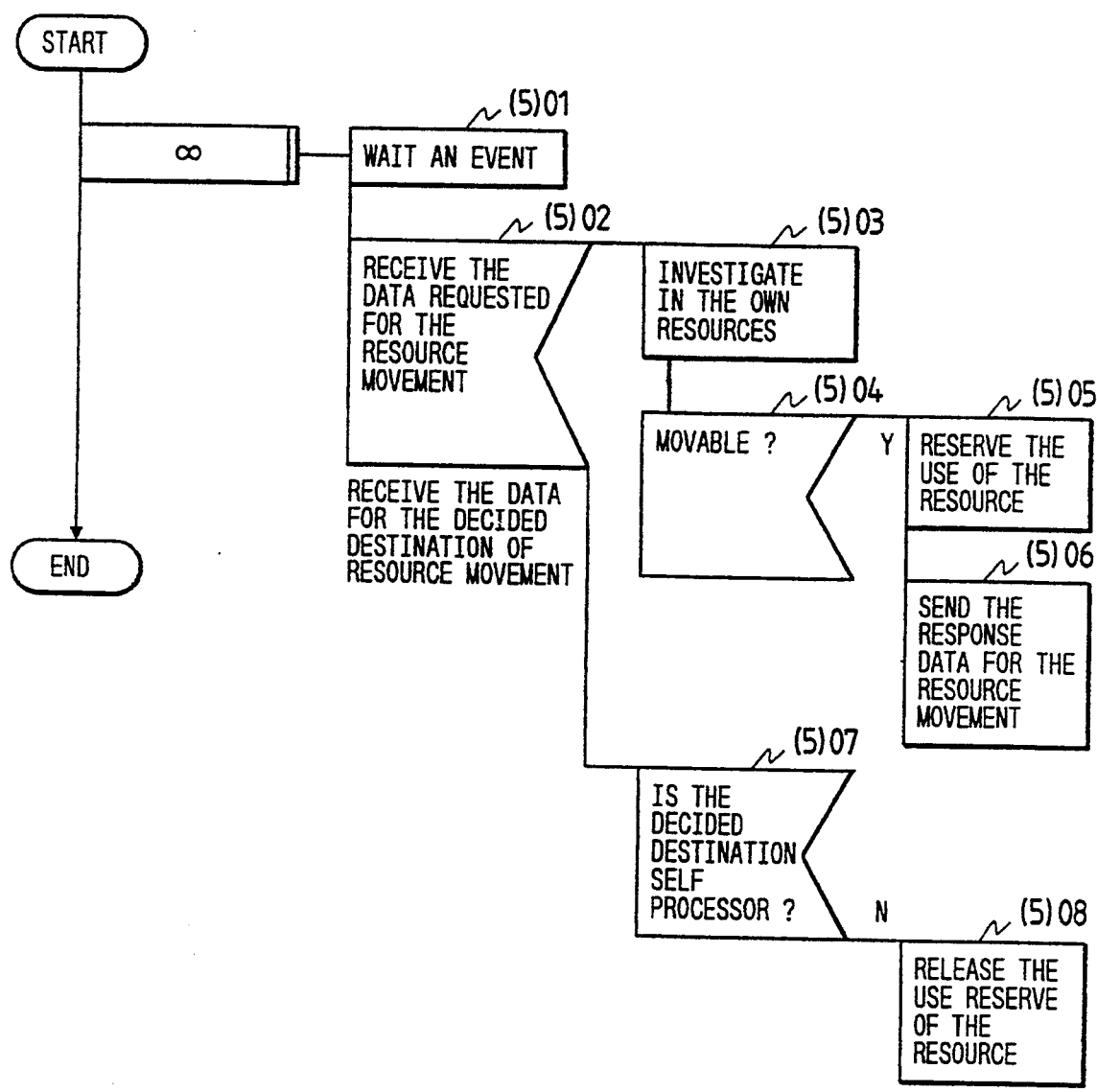
FIG. 5 is a flow chart illustrating decision process of destination of movement for a resource management server module.

On the basis of the determination, the resource management client module 106 starts the decision process of destination of the duplication (movement) (step 302). The decision process of destination of the duplication described below with reference to flow charts in FIGS. 4 and 5. FIG. 4 shows the decision process of destination of the duplication (movement) for the resource management client module 106. FIG. 5 shows the decision process of destination of the duplication (movement) for the resource management server module 107.

The term "movement" of resource as used herein denotes that the resource at a source is deleted, and the term "duplication" of resource denotes that the resource at the source is remained as it was. The movement and duplication are different in that sense only. The present invention can move the resource in either of the methods. Either of movement or duplication can be designated by user, or may be decided in the system in advance, The decision process of destination described below is on the assumption of movement, but can be similarly made for duplication.

Referring to FIGS. 2 and 4, the resource management client module 106 sends resource movement request data to the transmission line 10 through the communication control module 101 (step 401). These data contain a name list of the resources to be moved, a number of the resources, and particular data, such as size, of the resources if necessary. The example has one interaction right requested to move.

The resource movement request data are transferred to the resource management server modules of all the other processors through the transmission line 10. Referring to FIG. 5, on the other hand, when receiving the resource movement request data (steps 501 and 502), any of the resource management server modules investigates whether it can move the requested resources into its own processor or not (step 503). If possible (step 504), it reserves use of the movable resources for its own processor (step 505). It then sends the name list of the movable resources through the communication control module to the transmission line 10 as resource movement response data (step 506).

The resource management client module 106 of the processor 1 accumulates the resource movement response data. That is, after having sent the requested data in step 401, it starts a timer (step 402) to accumulate the response data until time-out (steps 403, 404, and 405). At the time-out, it decides one destination processor for each of the movable resources (step 406). It can be made that the destination should be automatically decided on the basis of a criterion, for example, a criterion of automatic selection of a processor physically closest thereto. Alternatively, it can be made that the user should have and select at his or her discretion any of the processors to which the resource can be moved indicated at the terminal.

After the destination to move is decided, the resource management client module 106 sends out movement destination decision data (step 407) and then the resource movement should be started (step 408).

On the other hand, the resource management server module having received the movement destination decision data does not do anything, but waits for movement of the resource if it finds that the destination is its own processor. Or, it cancels the reservation of using the resource that it reserved early if the decided destination is another processor (steps 507 and 508).

In the process described above, the resource management client module 106 of the processor 1 and the resource management server module of another processor decide the destinations to which the resources should be moved (step 302).

Referring to FIG. 3 again, after the movement destinations have been decided (step 302), the resources are actually moved (step 303). For simplicity, assume that all the destinations have been decided in the processor 2. In execution of the movement of any of the resources (the interaction right in the example), the resource management client module 106 requests the interactive client module 105 to abort the interaction right of the terminal 109 with the application program at first. After it is confirmed, the resource management client module 106 transfers contents of a screen buffer having the I/O data from/to the terminal 109 as data to the resource management client module of the processor 2 which was decided as the movement destination. The resource management server module of the processor 2 requests the interactive client module in its own processor 2 to acquire the interaction right, and duplicates the received contents of the screen buffer to a screen buffer of the terminal 209 having acquired the interaction right. This allows the user to successively run the application program a from the terminal 209. This ends the movement of the interaction right. The movement of the interaction right, alternatively, can be made in a way that the resource management client module at the destination should request the transfer of the interaction right and the duplication of the screen buffer.

After the movement or duplication of necessary resources is completed, the superuser should logically cut the processor 1 out of the system. In other words, he or she should prevent the processor 1 from communicating with the other processors. The superuser then should start the version-up procedures of the processor 1 (step 304). The version-up procedures can be made in a way similar to those of a so-called stand-alone process which is not connected to any network. In this state, the system is not in the Process multiplexed status before the version-up process since the application program a 112 that existed in the processor 1 has been deleted. It also is not in the file multiplexed status since access to the file A 111 becomes impossible. The user, however, can continue his or her work from the terminal 209 by use of the application program a as the process in the processor 2 and the file A.

If the processor 1 should be returned to its original state after end of the version-up procedures, resource duplication or movement (restoration) should be made (step 305). That is, the application program a 212 as the process should be duplicated first to the processor 1 for restoring to the process multiplexed status. The application program a as the process is made relocatable. In duplication, a source program is frozen before duplicating to the processor 1 all the data about the process, including the data needed to restart the process, and putting it to the destination processor 1 as the process. After completing the duplication, the source process is unfrozen. It takes a few seconds at most to make the restoration in connection with the duplication between the memories through the transmission line 10 and the process size of a few megabytes. This will not disturb the user's work even if the process is frozen for the period of time.

In turn, in order to restore the file multiplexing, the file A 211 in the external storage device 110 is duplicated for the processor 1. This can be made, for example, in a method disclosed in the Japanese Patent Application Hei 1-228949. The method basically includes a logical division of the source file into a number of small files. The number and size of the small files are at your discretion. It, for example, can be divided into equal sizes of blocks which are called in the operating system. Each of the small divided files, in turn, should be locked. The term "lock" as used herein denotes that the small file is in use. The locked file cannot be used in any of the other processes. The locked small file, in turn, should be duplicated in the destination. After the duplication, the small file should be released from locking. By repeating the file restoration procedures of locking, duplication, and releasing from locking until all the small files, the whole file are duplicated.

It is possible to access to the whole file in duplication. That is, it is possible to read from or write on the small files having not been locked. The application program cannot access to the one small file locked while it is subjected to the file restoration procedures of locking, duplication, and releasing from locking. It is, however, possible to reduce a probability and period of time that the application program cannot access the file as the divided size of the file can be made smaller. This means that the file restoration procedures will virtually not interrupt the user work.

After the version-up procedures, the superuser should decide whether the processor 1 should be set in a test mode or not before installing the processor 1 into the system again, or before starting the version-up method 1 to communicate with another processor. In the test mode, the communication control module 101 in the processor 1 can receive data from the transmission line 10, but will not send data. This allows the version-up method 1 to test the new version-up resources, such as a new operating system and hardware, with use of the on-line data received from the transmission line 10. This assures that even if the processor 1 makes a different process due to some cause, this will not affect the other processors.

If having determined that no problems are caused by sending data to the transmission line 10 in the test mode for a certain period of time, the superuser can release the processor 1 from the test mode, This installs the processor 1 into the system again as it was before the version-up.

As described so far, the first embodiment of the present invention has the advantage that it can effectively use the resources in the system if the software and hardware in the computer system connected through the network are made version-up. It also has the advantage that the version-up of the system can be carried on while the user continues the computer work. These advantages result from the feature that the resources of the processor to be made version-up are moved to or duplicated in another processor.

In turn, the following describes in detail a second embodiment according to the present invention to move any of programs and processes in any of processors to be made version-up.

Figure 6:
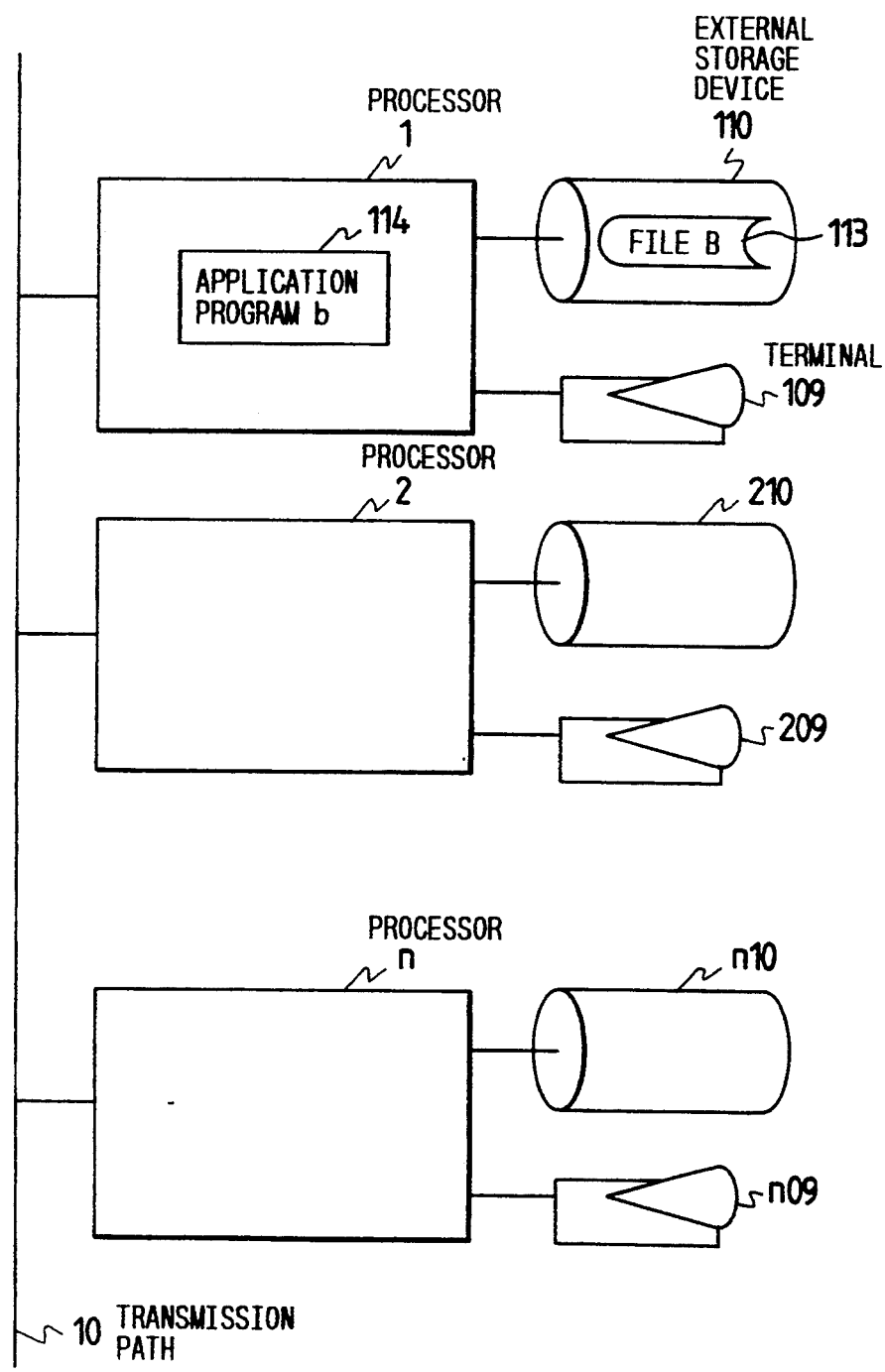
FIG. 6 is an example of a multiprocessor system to which a version-up method in a second embodiment of the present invention is applied.

FIG. 6 is an example of a multiprocessor system to which a version-up method in the second embodiment of the present invention is applied. The arrangements and parts in the figure identical with those in FIG. 1 are indicated by the same numbers as in FIG. 1. The processors shown in FIG. 6 are same as the ones in FIG. 2 except that the application program a 112 in FIG. 2 should be replaced by an application program b 114. Assume that a user directed the application program b to start from the terminal 109. The interactive monitor program analyzes the direction before requesting the interactive client module 105 to start the application program b. It also transfers an I/O right with the terminal 109 to the interactive client module 105. Accepting the right, the interactive client module 105 transfers the request to the communication control module 101 as start request data. The communication control module 101 sends the start request data to the transmission line 10.

The start request data is transferred to the interactive server module 104 in the processor 1 first. It also is transferred to the other processors through the transmission line 10. Assume that the application program b can be started only by the processor 1. This should be designated either when the user enters the start command or in advance. The interactive server module 104 of the processor 1 starts the application program b 114. Note that the user does not need to know what processor started the application program.

The data output to the terminal for the application program b 114 are transferred to the interactive client module 105 from the interactive server module 104 through the interactive server module 104. The interactive client module 105 sends the output data to the terminal 109. The data input to the terminal 109 are similarly transferred to the application program b 114 from the interactive client module 105.

Access request of the application program b 114 is accepted by the file client module 103. Accepting the request, the file client module 103 transfers it to the communication control module 101 as file access request data. The communication control module 101 sends the request data to the transmission line 10. In also transfers the request data to the file server module 102 in the processor 1. The file B now is defined only in the external storage device 110 for the processor 1. The file server module 102 accesses to the file B on the basis of the request data.

The file server module 102 of the processor 1 transfers access results to the file client module 103 through the communication control module 101 as file access results data. The file client module 103 of the processor 1 transfers the file access results data to the application program b 114.

Now, it is explained how to replace (version-up) the software or hardware of the processor 1, while the user is working with the terminal 109 in single process and single file modes of operation.

The following describes how to make version-up by reference to a flow chart in FIG. 3. First, resources controlled by the processor 1 are investigated (step 301). The investigation is made, for example, in a way similar to the one described for the first embodiment.

The resource management client module 106 having the controlled resources investigation request transferred thereto investigates the resources under its control as to whether they are alone in the system. That is, it investigates as to the five conditions mentioned previously.

In the second embodiment shown in FIG. 6 are provided the application program b as the process and the file B as the file which is being accessed. They both are not multiplexed. These, therefore, are determined that they should be duplicated or moved. As the user is interacting from the terminal 109 with the application program b, however, the system determines that the interaction right also must be moved (step 301).

On the basis of the determination, the resource management client module 106 starts the decision process of destination of the duplication (movement) (step 302). In detail, the 106 sends resource movement request data to the transmission line 10 through the communication control module 101. These data contain a name list of the resources to be moved, a number of the resources, and particular data, such as size, of the resources if necessary. The example has the application program b, its process, the file B, and the interaction right requested to move. The resource movement request data are transferred to the resource management server modules of all the other processors through the transmission line 10. Any of the resource management server modules investigates whether it can move the requested resources into its own processor or not. If possible, it sends the name list of the movable resources through the communication control module to the transmission line 10 as resource movement response data. The resource management client module 106 of the processor 1 accumulates the resource movement response data before deciding one destination processor for each of the movable resources. The decision of the movement destination is made in the same way as in the first embodiment described by reference to FIGS. 4 and 5.

After the destination to move is decided, the resource movement is started (step 303). Assume that all the destinations have been decided in the Processor 2.

In order to move the interaction right, the resource management client module 106 requests the interactive client module 105 to abort the interaction right of the terminal 109 with the application program b first. After it is confirmed, the resource management client module 106 transfers contents of a screen buffer having the I/0 data from/to the terminal 109 as data to the resource management client module of the processor 2 which was decided as the movement destination. The resource management server module of the processor 2 requests the interactive client module in its own processor 2 to acquire the interaction right, and duplicates the received contents of the screen buffer to a screen buffer of the terminal 209 having acquired the interaction right. This allows the user to successively run the application program b from the terminal 209. This ends the movement of the interaction right. The movement of the interaction right, alternatively, can be made in a way that the resource management client module at the destination should request the transfer of the interaction right and the duplication of the screen buffer.

In turn, the file should be moved. This can be made in the way that the file is multiplexed by duplication as described previously before the source file is deleted. In detail, the file 113 to be multiplexed is duplicated in the external storage device 210 for the processor 2.

The duplication is made by the resource management client module 106 of the processor 1 and the resource management server module of the processor 2 in the same way as the file restoration in the first embodiment described previously. The method basically includes a logical division of the source file into a number of small files. Each of the small divided files, in turn, should be locked. The locked small file, in turn, should be duplicated in the destination. After the duplication, the small file should be released from locking. The file restoration procedures of locking, duplication, and releasing from locking should be repeated until all the small files, that is, the whole file, are duplicated. It is possible to access to the whole file in duplication as described previously. After the file duplication, the source files existing in the external storage device 110 should be deleted.

The application program b can be moved in a way similar to the one for the file movement as the program itself is a file on the external storage device.

In turn, the process should be moved. The application Program b 114 as the process is relocatable. In order to move the application program b 114 as the process, the process of the source processor 1 should be set in a sleeping state first. The process generally comprises a text, data, and stacks. The text is a byte string that the CPU interprets as instructions of a machine language, the data are variables for static generation of areas at the time of process generation, and the stacks are variables for dynamic generation of areas at the time of execution. These should be duplicated from the processor 1 to the processor 2 in a priority order of the stack, the data, and the text. For the text section, parts (blocks) of the text containing instruction words which a program counter indicates are duplicated first. At the end of duplication, the process should be input as the preparation was completed. After this, the remaining parts of the text should be duplicated.

Before the remaining parts are fully duplicated, the process input as the duplication and preparation completion state may be executed because of a process scheduling. In the event, the instruction words for the remaining text parts may probably be executed. The operating system, then, stops the process execution before inputting the process in a queue of the preparation completion state. It then duplicates the necessary parts (blocks) of the text. The operation is repeated until the whole text section is duplicated. The source process then should be deleted to release the areas for the process. This completes the process movement.

After the movement or duplication of necessary resources is completed, the superuser should logically cut the processor 1 out of the system. In other words, he or she should prevent the processor 1 from communicating with the other processors. The superuser then should start the version-up procedures of the processor 1 (step 304). The user can continue his or her work from the terminal 209 with use of the application program b as the process in the processor 2 and the file B.

If the processor 1 should be returned to its original state after end of the version-up procedures, resource duplication or movement should be made (step 305). This can be made in the same way as in the resource movement before the version-up.

In the description for the first and second embodiment so far, the version-up was made for one processor by one. It can be made for a plurality of processors in parallel. In this case, one processor may allow a plurality of processors to move more resources than its capability. In order to solve such a problem, the destination processor must not give the resource movement response data not to allow moving the more resources than its capability. For this, for example, the destination processor should be made to reserve the resources to use at the time of receiving the movement request data. Alternatively, the source destination processor decides a destination before requesting the destination processor to reserve the resources and if the request is rejected because of the preceding version-up method, should retry the source movement request.

If the system comprises a single processor (which is not connected to the transmission line) or if it cannot move any resource because of full use of its memory, external storage device, or terminal, then a new temporary processor should be connected to the transmission line as a resource movement destination processor to be made version-up before the version-up procedures described above should be made. This allows the version-up without stopping the single processor. A number of the new temporary processors may be one or plural.

In the above embodiments, only the fact that the resource management client module has resource to move at the resource movement destination decision work can be sent out as the resource movement request data. In this case, the resource management server module having received the request data should check amount of resources movable into its own processor before sending items of the movable resources, their amounts, and similar particular data to the transmission line through the communication control module as the resource movement response data. The response data, for example, include files of 30 kbytes and three interaction rights. The resource management client module 106 accumulates the response data before deciding one destination processor for each movement resource.

As described so far, the present invention has the advantage that it can effectively use the resources in the system even if the software and hardware in the computer system having a plurality of processors connected thereto is to be changed for a version-up. It also has the advantage that the version-up of the system can be carried on while the user continues the computer work. These advantages result from the feature that the resources of the processor to be made version-up are moved to or duplicated in another processor.

What is claimed is:

1. A resource management method in a multiprocessor system having a plurality of processors connected in a communication network, comprising:
   a step performed in one of the processors to be made version-up, of investigating data of resources under control by the one processor for deciding selected data resources to be managed by at least one of movement and duplication from the processor during the version-up;
   a step performed by said one processor of sending the selected data to at least another processor;
   a step of receiving the selected data in said another processor;
   a step performed in said another processor of searching whether data necessary to said one processor for deciding a destination processor exists in the another processor, based upon the selected data resources;
   a step of sending the necessary data from said another processor, when data exists to said one processor;
   a step of receiving the necessary data in said one processor;
   a step performed in said one processor, of deciding a destination processor to which at least one of the movement and duplication is to be performed, based upon the received necessary data;
   a step of performing the at least one of the movement and duplication, to the decided destination processor; and,
   a step of executing version-up of said one processor.

2. The resource management method according to claim 1, further comprising:
   a step performed by said one processor, of accepting the resources sent from said another processor.

3. The resource management method according to claim 1, wherein the step of deciding a destination processor comprises:
   a sub-step of judging whether the resources under control by the one processor are resources that are only in the one processor in the multiprocessor system, for deciding whether or not the resources should be moved or duplicated.

4. The resource management method according to claim 1, wherein the step of sending the investigated data comprises:
   a sub-step of sending to the another processor a name list of resources for identification of the resources to be managed by the movement and duplication.

5. The resource management method according to claim 1, wherein the step of sending the selected data sends a request of at least one of movement and duplication of resources and the step of sending the necessary data answers back data of particulars of the searched resources to said one processor.

6. The resource management method according to claim 4, wherein the destination processor is decided for each of the resources to be moved or duplicated.

7. The resource management method according to claim 1, wherein the version-up is made for the plurality of processors in the network at the same time in parallel.

8. The resource management method according to claim 4, further comprising:
   each of the processors having received the name list making a reservation of accepting a particular resource, if there is any of the resources said each can accept.

9. The resource management method according to claim 4, further comprising:
   a sub-step performed after having decided the destination processor, by said one processor for requesting the destination processor to reserve the resource and if the destination processor accepts the reservation, starting said managing by one of movement and duplication of the resource.

10. The resource management method according to claim 1, wherein any of the destination processors of any of the resources is a processor temporarily and newly connected to the network.

11. A resource management method performed in a system having plurality of processors and a transmission line connecting said processors, comprising:
    a step of connecting the transmission line temporarily and newly to one of the processors to be made version-up;
    a step performed in the one processor of investigating data of resources under control by the one processor for deciding selected data of the investigated resources to be selectively moved and duplicated;
    a step performed by said one processor, of sending the selected data to at least another processor;
    a step of receiving the selected data in said another processor;
    a step performed in said another processor, of searching whether data necessary to said one processor for deciding a destination processor exists in the another processor itself, based upon the received selected data;
    a step of sending the necessary data from said another processor to said one processor, when the necessary data exists;
    a step of receiving the necessary data in said one processor;
    a step performed in said one processor, of deciding a destination processor to which the moving or duplicating of the selected data is to be performed, based upon the received necessary data;
    a step of performing at least one of the moving and duplicating, to the decided destination processor; and,
    a step of executing version-up of said one processor.

12. The resource management method according to claim 11, further comprising:
    a step performed by said one processor of accepting the resources sent from said another processor.

13. A resource management system in a multiprocessor system comprising:
    a plurality of processors;
    a network to which said processors are connected;
    means in one of the processors to be made version-up for investigating data of resources under control by the one processor for deciding selected resources to be managed by at least one of movement and duplication;
    means in said one processor for sending the selected resources to at least another processor;

means for receiving the selected resources in said another processor;

means in said another processor for searching whether data necessary to said one of the processors for determining a destination processor for the selected resources exists in the another processor itself, based upon the investigated data;

means for sending the necessary data from said another processor to the one processor, when the necessary data exists;

means for receiving the necessary data in said one processor;

means in said one processor for deciding the destination processor to which at least one of the movement and duplication is to be performed, based on the received necessary data;

means for performing the at least one of the movement and duplication, to the decided destination processor; and, means for executing version-up of the said one processor.

14. A resource management system comprising:

a plurality of processors and a transmission line connected to a one of the processors to be made version-up;

means for selectively connecting the transmission line temporarily and newly to another of the processors;

means in said one processor to be made version-up for investigating data of resources under control by itself for deciding resources to be managed by at least one of movement and duplication during the version-up;

means in said one of the processors for sending the investigated data to the another processor;

means for receiving the investigated data in said another processor;

means in said another processor for searching whether data necessary to said one processor for deciding a destination processor exists in the another processor itself, based upon the received investigated data;

means for sending the necessary data from said another processor, when the necessary data exists;

means for receiving the necessary data from said one processor;

means in said one processor for deciding the destination processor to which at least one of the movement and duplication is to be performed, based upon the received necessary data;

means for performing the at least one of the movement and duplication, to the decided destination processor; and, means for executing the version-up of said one processor.

* * * * *